(12) United States Patent
Tani (10) Patent No.: US 11,299,034 B2
(45) Date of Patent: Apr. 12, 2022

(54) INTAKE DEVICE STRUCTURE OF SADDLE RIDING VEHICLE

(71) Applicant: HONDA MOTOR CO., LTD., Tokyo (JP)

(72) Inventor: Yusaburo Tani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 221 days.

(21) Appl. No.: 16/704,746

(22) Filed: Dec. 5, 2019

(65) Prior Publication Data
US 2020/0238819 A1 Jul. 30, 2020

(30) Foreign Application Priority Data
Jan. 30, 2019 (JP) .............................. JP2019-014777

(51) Int. Cl.
| | | |
|---|---|---|
| *B60K 13/02* | (2006.01) | |
| *B62K 11/04* | (2006.01) | |
| *B62J 1/00* | (2006.01) | |
| *F01N 1/02* | (2006.01) | |
| *B60K 13/04* | (2006.01) | |
| *F02M 35/10* | (2006.01) | |
| *B62K 11/14* | (2006.01) | |
| *B62K 11/12* | (2006.01) | |

(52) U.S. Cl.
CPC .............. *B60K 13/02* (2013.01); *B60K 13/04* (2013.01); *B62J 1/00* (2013.01); *B62K 11/04* (2013.01); *F01N 1/02* (2013.01); *F02M 35/10144* (2013.01); *B62K 11/12* (2013.01); *B62K 11/14* (2013.01)

(58) Field of Classification Search
CPC . B60K 13/02; B60K 13/04; B62J 1/00; B62K 11/04; B62K 11/12; B62K 11/14; F01N 1/02; F02M 35/10144
See application file for complete search history.

(56) References Cited

U.S. PATENT DOCUMENTS

| | | | | |
|---|---|---|---|---|
| 8,944,197 | B2 * | 2/2015 | Matsushima | .... F02M 35/10091 180/68.3 |
| 2012/0145470 | A1 * | 6/2012 | Fujiyama | ........... F02M 35/0203 180/219 |
| 2013/0240276 | A1 * | 9/2013 | Matsushima | .......... B62K 11/04 180/68.3 |

FOREIGN PATENT DOCUMENTS

| | | | |
|---|---|---|---|
| DE | 102011005856 A1 * | 5/2012 | ......... B01D 46/0005 |
| EP | 2644856 A1 * | 10/2013 | ............ F02M 25/06 |
| JP | H09-021354 A | 1/1997 | |
| JP | 2010-190058 | 9/2010 | |

(Continued)

OTHER PUBLICATIONS

Japanese Office Action dated Sep. 1, 2020, with English translation, 9 pages.

*Primary Examiner* — James A Shriver, II
*Assistant Examiner* — Michael T. Walsh
(74) *Attorney, Agent, or Firm* — Rankin, Hill & Clark LLP (57) ABSTRACT

The intake device structure of the saddle riding vehicle includes a head pipe; a main frame that extends rearward from the head pipe; a seat rail that extends rearward from the main frame; sub-frames that connect the main frame and the seat rail to each other; a seat that is supported on the seat rail; and an intake device. The intake device includes an element that is inclined rearward as the element extends upward, and the element is also mounted underneath the seat rail in side view such that the element is located along the sub-frames.

7 Claims, 8 Drawing Sheets

(56) References Cited

FOREIGN PATENT DOCUMENTS

| | | | | |
|---|---|---|---|---|
| JP | 2010190058 A | * | 9/2010 | |
| JP | 2011-047294 A | | 3/2011 | |
| JP | 2013-227965 A | | 11/2013 | |
| JP | 2013227965 A | * | 11/2013 | ........... F02M 35/048 |
| JP | 2018-173034 A | | 11/2018 | |
| JP | 2018173034 A | * | 11/2018 | |
| WO | 2005/100776 A1 | | 10/2005 | |

\* cited by examiner

FIG.8

INTAKE DEVICE STRUCTURE OF SADDLE RIDING VEHICLE

INCORPORATION BY REFERENCE

The present application claims priority under 35 U.S.C. § 119 to Japanese Patent Application No. 2019-014777 filed on Jan. 30, 2019. The content of the application is incorporated herein by reference in its entirety.

TECHNICAL FIELD

The present invention relates to an intake device structure of a saddle riding vehicle.

BACKGROUND ART

A motorcycle is conventionally well-known in which an element of an intake device is placed in such a manner as to be located along a body frame in side view (see, e.g., Patent Literature 1). In Patent Literature 1, the element is mounted to be located along an upper portion of a seat rail of the body frame in side view, so that the element is protected by the seat rail.

CITATION LIST

Patent Literature

[Patent Literature 1] JP-A No. 2010-190058

SUMMARY OF INVENTION

Technical Problem

In this regard, in the saddle riding vehicles, because empty space is easily obtained under the seat, the placement of the intake device under the seat is desirable in tams of ensuring of capacity of the intake device. However, for the seat (seating portion), the height of a load portion astride which the rider sits is required to be minimized. To achieve this, if the element of the intake device is placed to be located along the upper portion of the seat rail of the body frame in side view as disclosed in Patent Literature 1, the placement of the element under the seat is difficult in tams of layout.

An aspect of the present invention has been achieved in view of the above-mentioned circumstances, and it is an object thereof to provide an intake device structure of a saddle riding vehicle which enables the placement of an element of an intake device under a seat while protecting the element by use of a body frame.

Solution Problem

An intake device structure of a saddle riding vehicle includes: a head pipe (17); a main frame (18) that extends rearward from the head pipe (17); a seat rail (25) that extends rearward from the main frame (18); sub-frames (26L, 26R) that connect the main frame (18) and the seat rail (25) to each other; a seat (13) that is supported on the seat rail (25); and an intake device (61), wherein the intake device (61) includes an element (62) that is inclined rearward as the element (62) extends upward, and the element (62) is also mounted underneath the seat rail (25) in side view such that the element (62) is located along the sub-frames (26L, 26R).

In the above configuration, the element (62) may block, from below, a communication port (73G) that allows a dirty side (67B) and a clean side (67A) to communicate with each other.

Also, in the above configuration, the element (62) may be demountable from a side of the vehicle.

Also, in the above configuration, the intake device (61) may include a protective member (75) that protects the element (62), and the protective member (75) may be placed in a clean side (67A) and may be fastened from a dirty side (67B).

Also, in the above configuration, the sub-frames (26L, 26R) may be mounted as a pair in a vehicle width direction. And, in side view, one sub-frame (26L) of the sub-frames (26L, 26R) may be offset from the other sub-frame (26R) in at least one of a rearward direction and a downward direction, and the other sub-frame (26R) may be mounted in a position where the other sub-frame (26R) covers a side of the element (62), and the element (62) may be demountable from above the one sub-frame (26L).

Also, in the above configuration, the structure may further include: a positioning portion (73M) that is placed on the other side in the vehicle width direction, and that is engaged with the element (62) to position the element (62); and a guide (73N) that guides mounting of the element (62) in order for the element (62) to be engaged with the positioning portion (73M). The element (62) may be mountable from one side in the vehicle width direction.

Also, in the above configuration, the intake device (61) may be mounted with a funnel (63) that is mounted in a replaceable manner.

Also, in the above configuration, a muffler (38) may be situated underneath the other sub-frame (26R).

Advantageous Effects of Invention

The intake device structure of the saddle riding vehicle includes: a head pipe; a main frame that extends rearward from the head pipe; a seat rail that extends rearward from the main frame; sub-frames that connect the main frame and the seat rail to each other; a seat that is supported on the seat rail; and an intake device. The intake device includes an element that is inclined rearward as the element extends upward, and the element is also mounted underneath the seat rail in side view such that the element is located along the sub-frames. With the configuration, the element of the intake device is inclined rearward as the element extends upward. Thereby, the volume of the clean side is ensured while the vehicle height is minimized, and also even if dust falls during the demounting/mounting of the element, the dust can be made easy to fall to the dirty side, but difficult to enter the clean side. Further, in side view, the element is placed underneath the seat rail and located along the sub-frames which connect the main frame and the seat rail to each other. Thereby, the element can be protected and also placed underneath the seat, so that the degree of freedom in design can be offered.

In the above configuration, the element may block, from below, the communication port which allows the dirty side and the clean side to communicate with each other. With the configuration, even if dust falls from the intake device during the demounting of the element, the dust can be caught on the element which is being demounted.

Also, in the above configuration, the element may be demountable from the side of the vehicle. With the configuration, the demounting/mounting process of the element is facilitated, so that the working efficiency of the demounting/mounting process can be improved.

Also, in the above configuration, the intake device may include the protective member to protect the element. The protective member may be placed in the clean side and fastened from the dirty side. With this configuration, the sealing characteristics between the intake device and the protective member can be ensured, and also, when demounting/mounting of the element is performed from the side of the vehicle, the element can be prevented from catching by the protective member.

Also, in the above configuration, the sub-frames may be mounted as a pair in the vehicle width direction. In side view, one of the sub-frames may be mounted to be offset from the other sub-frame in at least one of the rearward direction and the downward direction. The other sub-frame may be mounted in the position where the other sub-frame covers a side of the element, and the element may be demountable from above the one sub-frame. With the configuration, the sub-frames paired in the vehicle width direction are offset in the front-rear direction or the vertical direction from each other. Thereby, ensuring of the working efficiency of demounting/mounting of the element, and the protection of the element can be enabled.

Also, in the above configuration, the structure may include the positioning portion that is placed on the other side in the vehicle width direction, and that is engaged with the element to position the element. The structure may include the guide guiding mounting of the element to cause the element to be engaged with the positioning portion. The element may be mountable from one side in the vehicle width direction. With the configuration, because the one side is difficult to be visually checked from the other side, the element is guided by the guide, and thereby, the mounting of the element can be facilitated.

Also, in the above configuration, the intake device may be mounted with the funnel that is mounted in a replaceable manner. With the configuration, the funnel of the intake device can be replaced with another displacement funnel. Thus, commonality of the intake device is enabled between vehicle types with different displacements. Because of the commonality of the intake device, a reduction in manufacturing costs can be achieved.

Also, in the above configuration, the muffler may be situated downward of the other sub-frame. With the configuration, the placement of the muffler on the other side in the vehicle width direction allows the muffler to be placed downward of the other sub-frame which protects the side of the element. Thereby, the effective use of space can be made in the saddle riding vehicle with a limited carrying space.

DESCRIPTION OF EMBODIMENTS

Embodiments according to the present invention will now be described with reference to the accompanying drawings.

It is noted that, throughout the description, words for directions such as front, rear, left, right, upward and downward are used in conformity with directions with respect to the vehicle body unless otherwise stated. Also, in each drawing, a reference sign FR denotes the front of the vehicle body, a reference sign UP denotes the upper side of the vehicle body and a reference sign LH denotes the left of the vehicle body.

Figure 1:
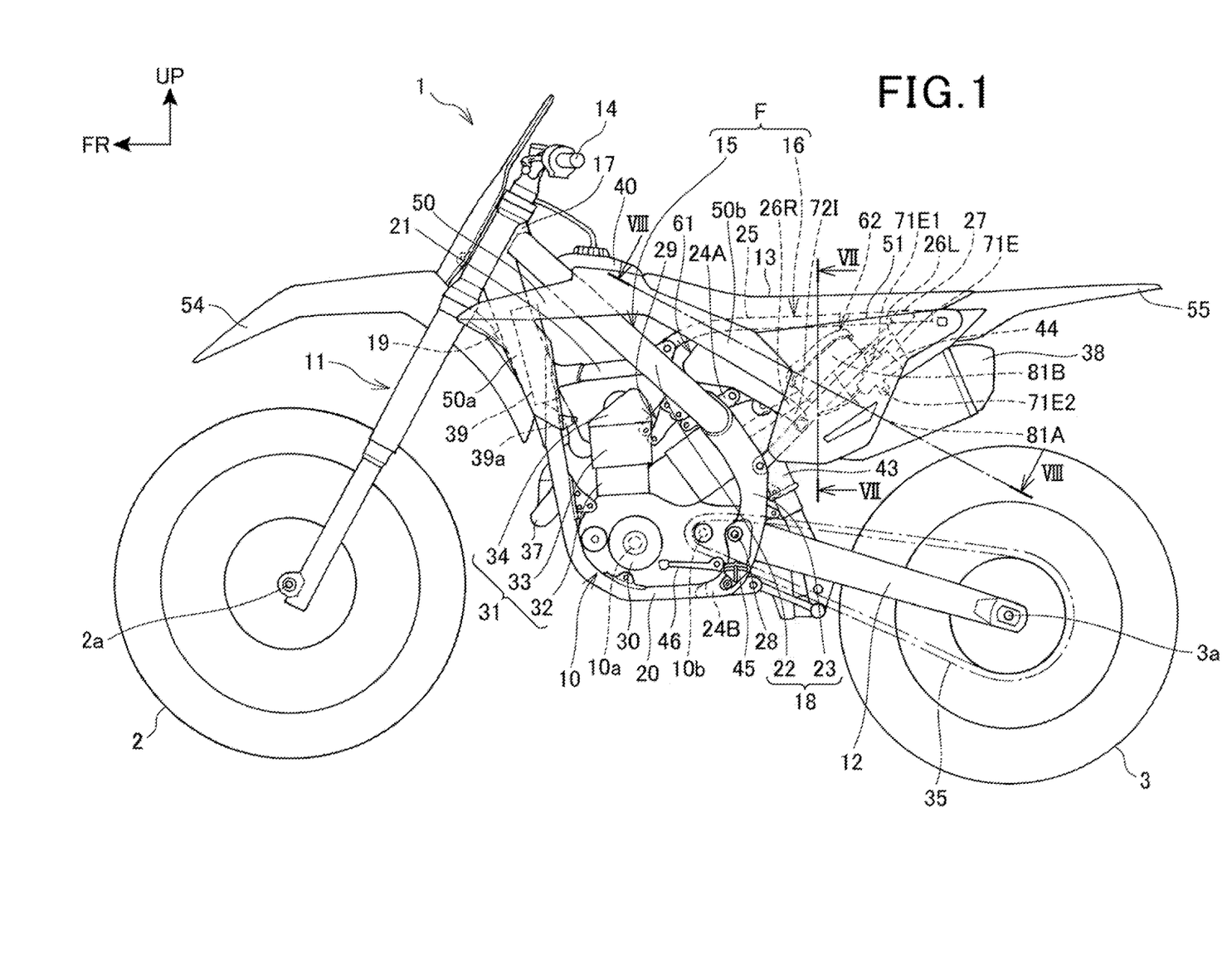
FIG. 1 is a left side view of a motorcycle according to an embodiment of the present invention.

FIG. 1 is a left side view of a motorcycle 1 according to an embodiment of the present invention.

The motorcycle 1 is a vehicle in which: an engine 10 acting as a power unit is supported by a body frame F; a front fork 11 steerably supports a front wheel 2 and the front fork 11 is steerably supported at a front end of the body frame F; and a swing aim 12 supports a rear wheel 3 and the swing aim 12 is mounted on a rear portion side of the body frame F. The motorcycle 1 is a saddle riding vehicle including a seat 13 astride which a rider sits, the seat 13 being mounted above a rear portion of the body frame F.

Figure 2:
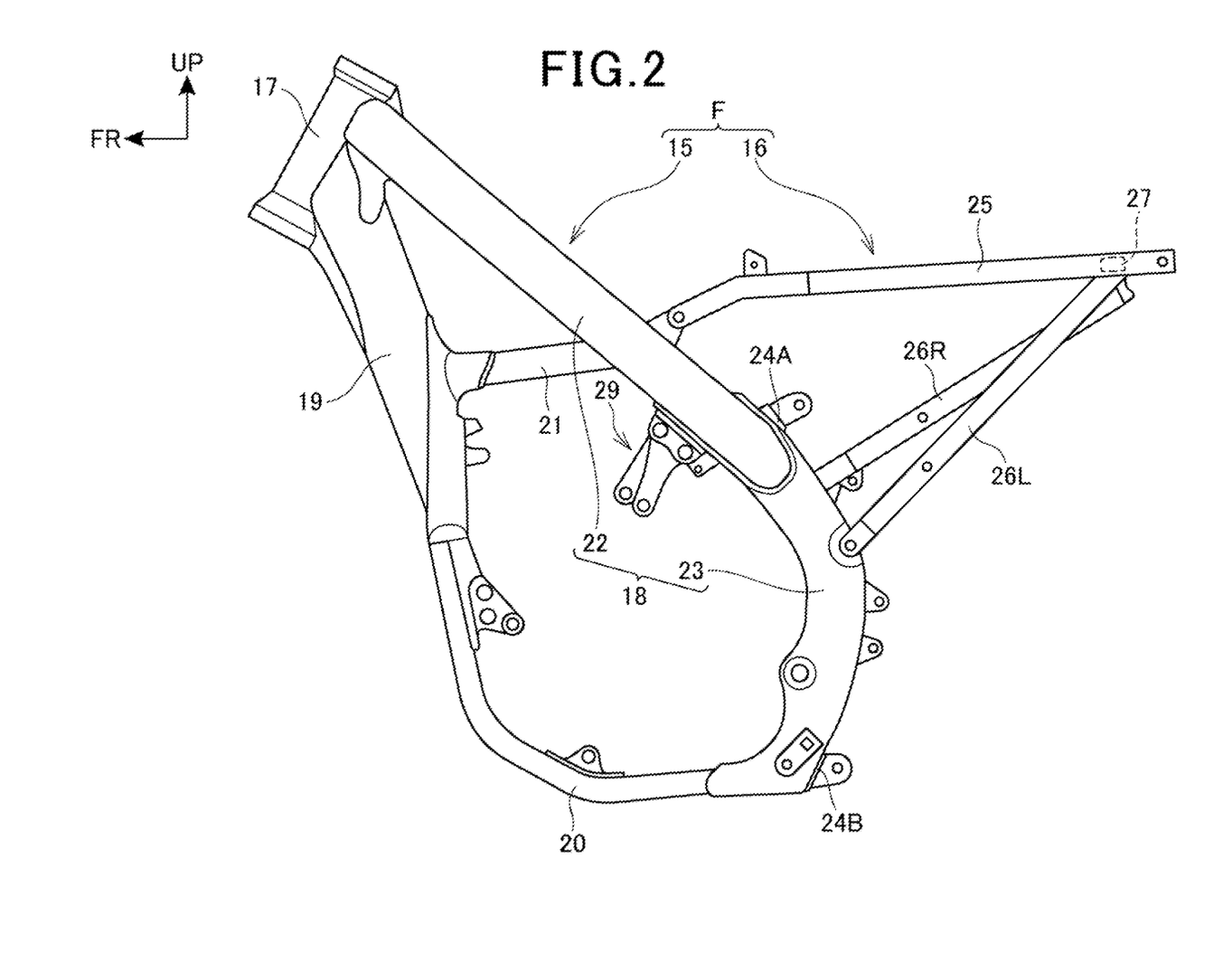
FIG. 2 is a left side view of a body frame.

FIG. 2 is a left side view of the body frame F.

As illustrated in FIG. 1 and FIG. 2, the body frame F includes: a front frame 15 supporting the engine 10 which is an internal combustion engine; and a rear frame 16 extending rearward from the front frame 15.

The front frame 15 includes: a head pipe 17 mounted at a front end; a pair of left and right main frames 18, 18; a down frame 19; a pair of left and right lower frames 20, 20; a pair of left and right reinforcing frames 21, 21; and a pair of upper and lower cross frames 24A, 24B which couple the main frames 18, 18 to each other in the vehicle width direction.

Specifically, the left and right main frames 18, 18 in a pair extend rearward to be inclined downwardly toward the rear from a rear face of the head pipe 17. In the embodiment, the left and right main frames 18, 18 include integrally: a pair of left and right main tubes 22, 22 which extend downwardly toward the rear from the rear face of the head pipe 17; and a pair of left and right center frames 23, 23. The center frames 23, 23 extend in a downward and rearward direction at a steeper inclination than the main tubes 22, 22 from rear ends of the main tubes 22, 22, and then the center frames 23, 23 further extend downward. In front end portions, the main frames 18, 18 extend in a downward and rearward direction while gradually increasing the space between the main frames 18, 18 in the vehicle width direction, and then in rear portions, the main frames 18, 18 further extend in a downward and rearward direction in approximately parallel to each other.

The down frame 19 has an upper end portion connected to a position underneath the main frames 18, 18 in a rear portion of the head pipe 17 and the front end portions of the main frames 18, 18, and from there the down frame 19 extends in a downward and rearward direction at a steeper inclination than the main frames 18, 18. The down frame 19 is a single frame extending in the center in the vehicle width direction.

The lower frames 20, 20 branch into left and right and extend downward from a lower end portion of the down frame 19, respectively. Then, the lower frames 20, 20 bend and extend rearward to be connected to lower end portions of the center frames 23, 23.

The reinforcing frames 21, 21 are connected between the down frame 19 and the main frames 18, 18. Specifically, the reinforcing frames 21, 21 extend forward to be inclined slightly downward toward the front from the undersides of vertically central portions of the main tubes 22, 22 of the main frames 18, 18, respectively. Then, front portions of the reinforcing frames 21, 21 bend inward in the vehicle width direction to be connected to a rear face of the upper portion of the down frame 19.

The upper cross frame 24A extends in the vehicle width direction to couple the upper ends of the center frames 23, 23 to each other.

The lower cross frame 24B extends in the vehicle width direction to couple the lower ends of the center frames 23, 23 to each other.

The rear frame 16 includes a pair of left and right seat rails 25, 25 a pair of left and right sub-frames 26L, 26R and a rear cross frame 27.

Specifically, the seat rails 25, 25 extend rearward from the main frames 18, 18. In the embodiment, the seat rails 25, 25 extend rearward from the vertically central portions of the main tubes 22, 22 of the main frames 18, 18, with a posture in which the seat rails 25, 25 are inclined upwardly toward the rear.

The sub-frames 26L, 26R are respectively connected between the main frames 18, 18 and the seat rails 25, 25. In the embodiment, the sub-frames 26L, 26R extend upwardly toward the rear at a steeper inclination than the seat rails 25, 25 from the vicinities of upper ends of the center frames 23, 23 of the main frames 18, 18, and then the sub-frames 26L, 26R are connected to rear ends of the seat rails 25, 25. Of the sub-frames 26L, 26R paired in the left-right direction (vehicle width direction), the left (one) sub-frame 26L extends rearward from a lower portion of the upper end portion of the left center frame 23. Likewise, the right (other) sub-frame 26R extends rearward from an upper portion of the upper end portion of the right center frame 23.

The rear cross frame 27 extends in the vehicle width direction to couple the rear ends of the left and right seat rails 25, 25 to each other.

The front fork 11 is rotatably supported by the head pipe 17 via a steering shaft (not shown) which is journaled in the head pipe 17. The front wheel 2 is journaled on a front-wheel axle 2a mounted at the lower end portion of the front fork 11. A handlebar 14, which is used to steer the front wheel 2 by the rider, is attached to the upper end portion of the front fork 11.

The swing aim 12 has a front end portion pivotally supported on a pivot shaft 28 that couples the left and right center frames 23, 23 to each other in the vehicle width direction, so that the swing aim 12 vertically swings about the pivot shaft 28. The rear wheel 3 is journaled on a rear-wheel axle 3a that is inserted through a rear end portion of the swing aim 12.

A rear cushion 43 is stretched between the front end portion of the swing aim 12 and the upper cross frame 24A of the front frame 15.

The engine 10 is placed on the inside of the front frame 15 which is formed in a frame shape in side view, and the engine 10 is supported by the front frame 15. An engine hanger 29 is secured to rear portions of the main tubes 22, 22 of the main frames 18, 18, and the engine hanger 29 extends forward.

The engine 10 includes: a crankcase 30 that supports a crankshaft 10a extending in the vehicle width direction; and a cylinder section 31 that extends upward from a front portion of the crankcase 30. In side view, the crankcase 30 is located between the lower end portion of the down frame 19 and the center frames 23, 23.

The cylinder section 31 includes, in the order from the crankcase 30 side: a cylinder block 32; a cylinder head 33; and a head cover 34 that covers a valve train in an upper face portion of the cylinder head 33. In side view, the head cover 34, which forms au upper end of the cylinder section 31, is located between the down frame 19 and rear portions of the main tubes 22, 22 of the main frames 18, 18, and also located underneath the reinforcing frames 21, 21. Front end portions of the engine hanger 29 are coupled to side faces of a rear portion of the cylinder head 33.

A transmission (not shown) is built in a rear portion of the crankcase 30. The transmission reduces and outputs the speed of rotation of the crankshaft 10a toward the rear wheel 3 side. Within the crankcase 30, a clutch (not shown) is mounted to be engaged and disengaged to transfer the power of the crankshaft 10a to the transmission.

The output of the engine 10 is transferred to the rear wheel 3 through a chain 35 which is wound on and placed between an output shaft 10b of the transmission of the engine 10 and the rear wheel 3.

An exhaust pipe 37 of the engine 10 is extracted forward from an exhaust port (not shown) on the front face of the cylinder section 31, and then the exhaust pipe 37 is folded in a U shape. The exhaust pipe 37 thus folded in a U shape extends rearward through alongside the other side (alongside the right side) of the cylinder section 31, and then a rear end of the cylinder section 31 is connected to a muffler 38 placed rearward of the front frame 15.

The motorcycle 1 includes a pair of left and right plate-shaped radiators (cooling devices) 39, 39 to dissipate heat from cooling water of the engine 10. The radiators 39, 39 are placed separately from each other on the left and right sides of the down frame 19 in an upper area in front of the cylinder section 31. The radiators 39, 39 are place in a vertical position such that the heat-dissipating surface which is a face in the direction of plate thickness faces toward the front of the motorcycle 1.

A radiator hose 39a is connected between the radiator 39 and the cylinder head 33 to circulate the cooling water between the radiator 39 and the cylinder head 33.

A fuel tank 40 is placed between the head pipe 17 and the seat 13 and also upward of the main frames 18, 18, so that the fuel tank 40 is supported by the main tubes 22, 22 of the main frames 18, 18.

The seat 13 extends rearward from a rear portion of the fuel tank 40 along the upper faces of the seat rails 25, 25. The seat 13 is supported by the seat rails 25, 25.

A pair of left and right steps 45, 45 on which the rider rests his/her feet is mounted to lower end portions of the center frames 23, 23. A shift pedal 46 is mounted forward of the step 45 on the left side.

An air cleaner box 61 is placed underneath the seat 13.

A regulator 44 is placed on a rear portion of the left sub-frame 26L. The regulator 44 converts electric power generated by a generator (not shown), into DC power at an appropriate voltage for supply to each component of the motorcycle 1.

The motorcycle 1 includes, as a body cover, a pair of left and right radiator shrouds 50, 50, and a pair of left and right rear side covers 51, 51.

Each radiator shroud 50 includes integrally: a shroud portion 50a that covers the radiator 39 from the outward side; and a side cover portion 50b that extends rearward from a upper end portion of the shroud portion 50a on the outward side of the main frame 18 so that the side cover portion 50b covers, from the outward side, the main frame 18, the fuel tank 40, under a front portion of the seat 13, and a front portion of the air cleaner box 61.

Each rear side cover 51 is situated underneath the rear portion of the seat 13 so that the rear side cover 51 covers, from the outward side, the rear frame 16, a rear portion of the air cleaner box 61, the regulator 44 and the muffler 38.

The motorcycle 1 also includes a rear fender 55 and a front fender 54 that is attached to the front fork 11 to cover the front wheel 2 from above.

Figure 3:
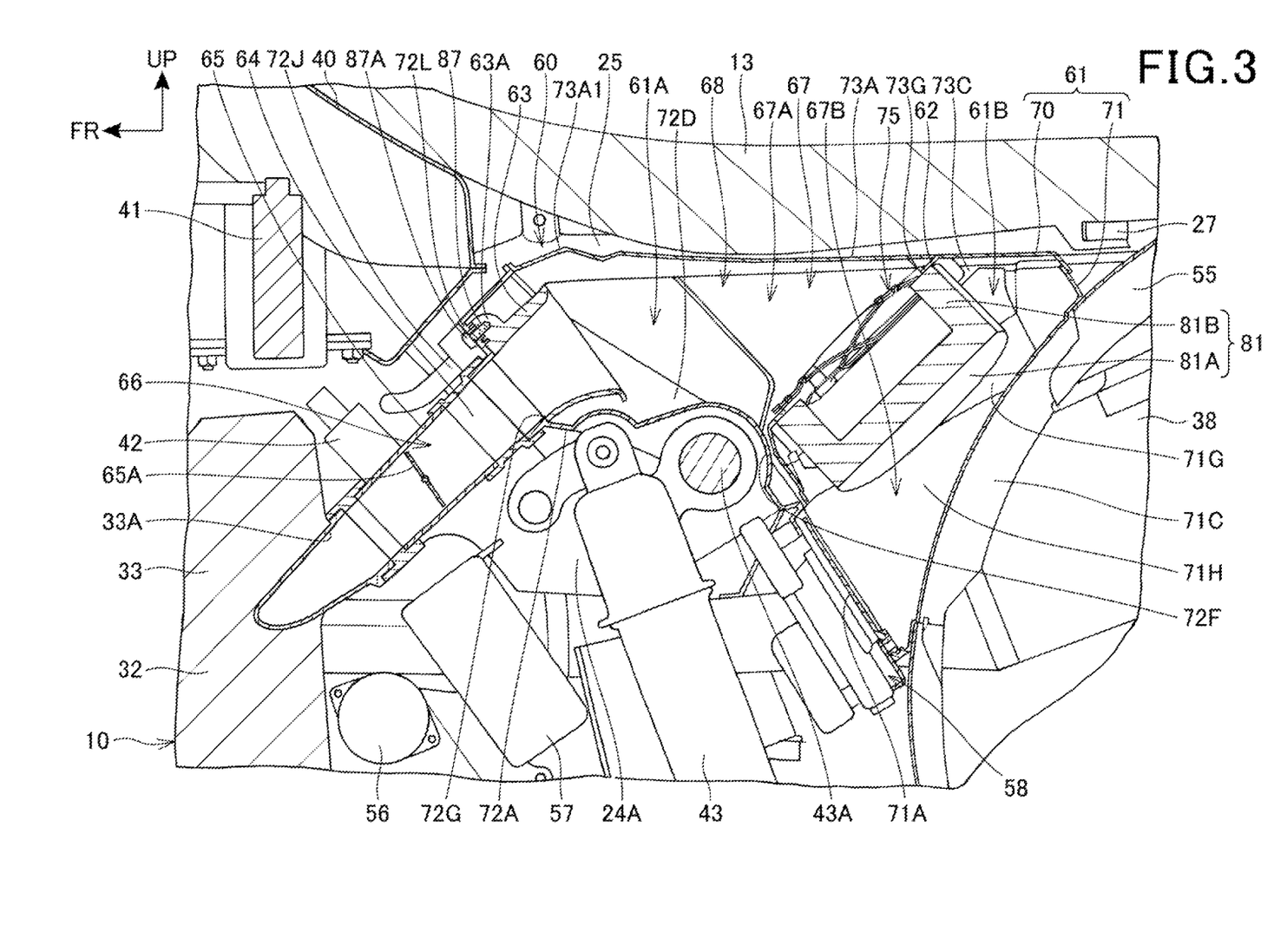
FIG. 3 is a longitudinal sectional view taken along a body center, the view illustrating an area underneath a seat.

FIG. 3 is a longitudinal sectional view taken along a body center (a center line in the vehicle width direction of the vehicle body), the view illustrating an area underneath the seat 13 of the motorcycle 1.

An intake system 60 of the engine 10 includes: the air cleaner box (intake device) 61; an element 62 that is placed within the air cleaner box 61; a funnel 63 that is placed within the air cleaner box 61; a connecting tube 64 that is connected to the funnel 63; and a throttle body 65 that is connected to the connecting tube 64. The throttle body 65 is connected to an intake port 33A on a rear face of the cylinder head 33. The connecting tube 64 and the throttle body 65 form an intake passage 66. The intake passage 66 extends from the air cleaner box 61, linearly in a downward and forward direction above the upper cross frame 24A, and the intake passage 66 communicates with the intake port 33A of the cylinder head 33.

The fuel tank 40 is placed in front of the seat 13. The fuel tank 40 is equipped with a fuel pump 41 therein. An injector 42 is placed rearward of and downward of the fuel pump 41, and the injector 42 extends downward toward the front. The injector 42 is connected to the throttle body 65 on the intake port 33A side with respect to the throttle valve 65A. The injector 42 is supplied with fuel from the fuel pump 41 through a not-shown fuel hose. The injector 42 injects fuel into the intake passage 66.

The rear cushion 43 is placed underneath the air cleaner box 61. A battery 57 is placed forward of the rear cushion 43 and downward of the throttle body 65. A starter motor 56, which starts the engine 10, is placed forward of and downward of the battery 57. The starter motor 56 is supplied with electric power from the battery 57.

An ECU (Electronic Control Unit) 58 is placed rearward of the rear cushion 43. The ECU 58 is supported by the air cleaner box 61.

Figure 4:
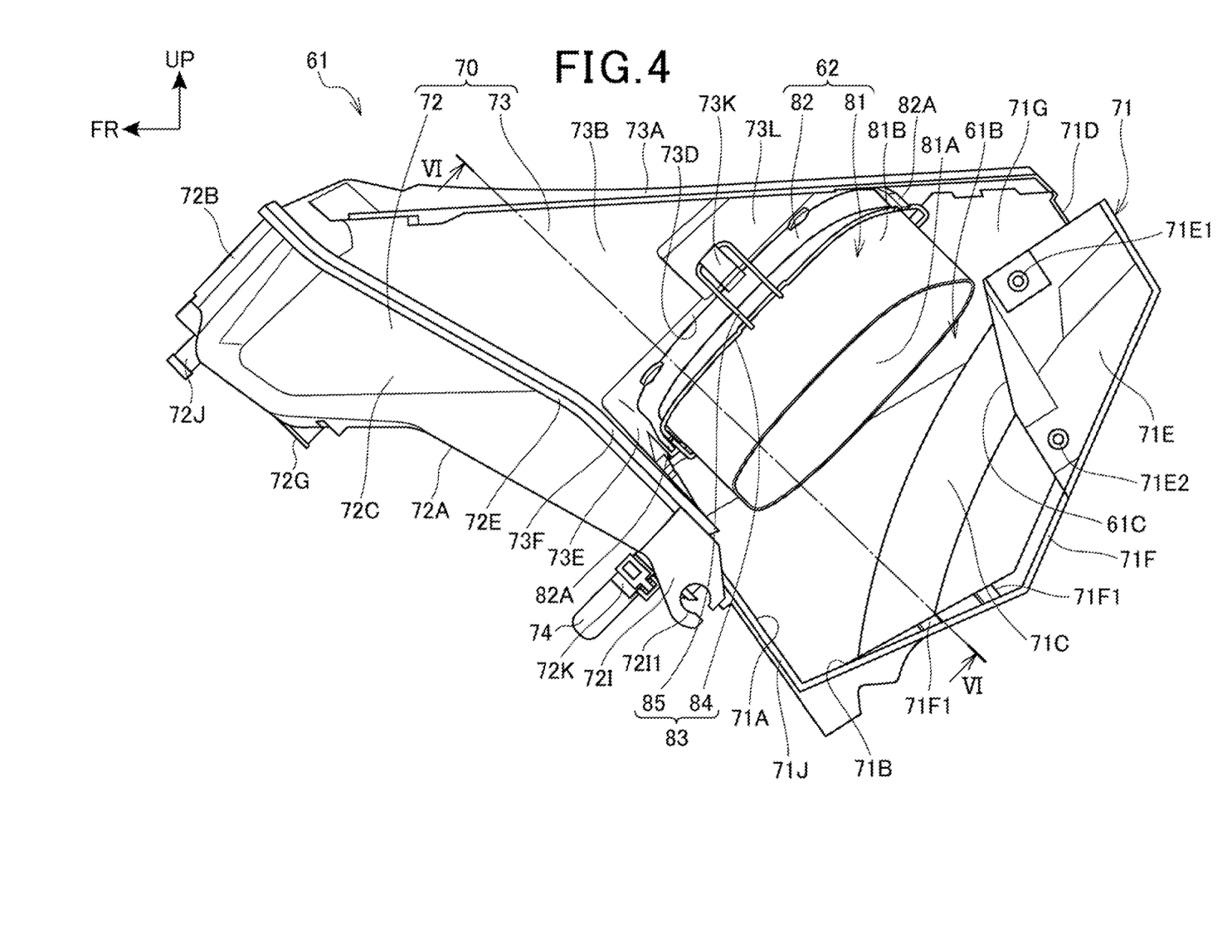
FIG. 4 is a left side view of an air cleaner box.
Figure 5:
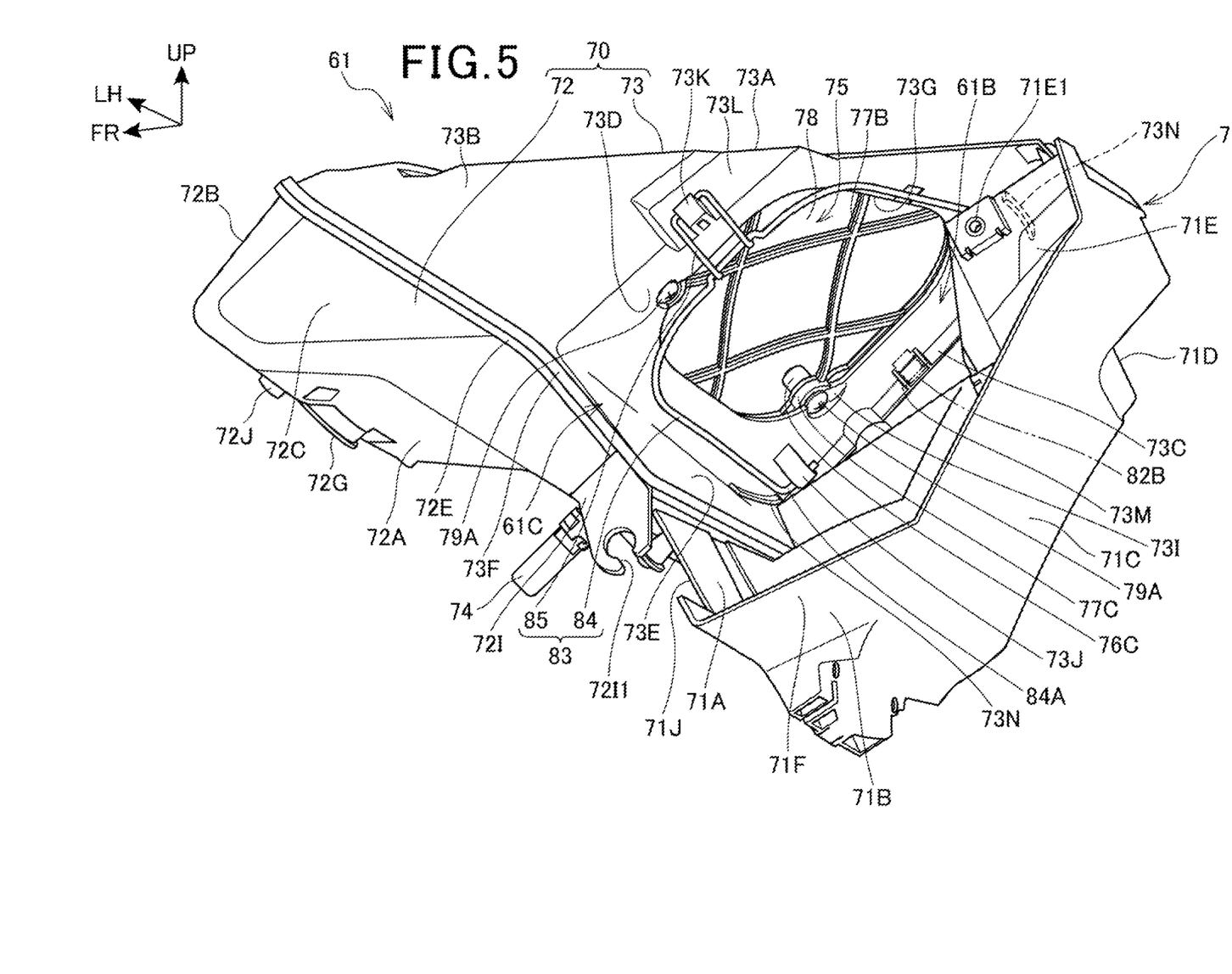
FIG. 5 is a rear perspective view of the air cleaner box from which an element is removed.

FIG. 4 is a left side view of the air cleaner box 61. FIG. 5 is a rear perspective view of the air cleaner box 61 from which the element 62 is removed.

The air cleaner box 61 includes a box portion 70 that is formed to have a hollow interior, and an introduction cover portion 71 connected to the rear of the box portion 70.

The box portion 70 is structured by assembling a pair of upper and lower recess-shaped halves 72, 73 together, so that the box portion 70 is configured to have a hollow interior.

The half 72 on the lower side includes a plate-shaped front wall 72A to which the connecting tube 64 (see FIG. 3) is connected. The front wall 72A extends downward toward the rear. An upper-side sidewall 72B is foiled at an upper end of the front wall 72A and the upper-side sidewall 72B extends upward toward the rear. A left-side sidewall 72C and a right-side sidewall 72D (see FIG. 3) are famed respectively on the left and right sides of the front wall 72A and the upper-side sidewall 72B. The front wall 72A, upper-side sidewall 72B, left-side sidewall 72C and right-side sidewall 72D thus form the lower-side half 72 with a downward recessed shape. A lower end of the front wall 72A, an upper rear end of the upper-side sidewall 72B, an upper rear end of the left-side sidewall 72C and an upper rear end of the right-side sidewall 72D form an opening shape, and a flange-shaped joint 72E is famed along the edge of the opening shape.

The half 73 on the upper side includes a plate-shaped upper wall 73A extending in the front-rear direction. A left-side sidewall 73B and a right-side sidewall 73C (see FIG. 3), which are each famed in an inverted triangular shape in side view, are formed respectively on the left and right sides of the upper wall 73A. The right-side sidewall 73C extends to a point rearward of the left-side sidewall 73B. On a rear portion of the left-side sidewall 73B, as illustrated in FIG. 5, a plate-shaped partition rear wall 73D is formed and extends toward the right-side sidewall 73C to be connected to the left face of the right-side sidewall 73C. Thus, the right-side sidewall 73C extends rearward of the partition rear wall 73D. The partition rear wall 73D is inclined upward as it extends rearward. The partition rear wall 73D is also inclined rearward as it extends from the left-side sidewall 73B toward the right-side sidewall 73C. The partition rear wall 73D has a rear face facing slightly leftward.

A lower wall 73E, which faces the half 72 on the lower side, is foiled at a lower end of the partition rear wall 73D. The lower wall 73E extends downward toward the rear from the lower end of the partition rear wall 73D. The upper wall 73A, left-side sidewall 73B, right-side sidewall 73C, partition rear wall 73D and lower wall 73E thus form the upper-side half 73 with an upward recessed shape. A flange-shaped joint 73F is famed at a front end of the upper wall 73A, a lower front end of the left-side sidewall 73B, a lower front end of the right-side sidewall 73C, and an outer peripheral edge of the lower wall 73E.

The joint 72E of the lower-side half 72 and the joint 73F of the upper-side half 73 face each other and are joined together to form the box portion 70. An interior space 61A (see FIG. 3) is created inside the box portion 70.

The introduction cover portion 71 is supported in a rear portion of the box portion 70. The introduction cover portion 71 includes a cover front wall 71A extending downward toward the rear along the front wall 72A of the box portion 70. A cover lower wall 71B is formed at a lower end of the cover front wall 71A and the cover lower wall 71B extends in an upward and rearward direction. A cover rear wall 71C is formed rearward of the cover lower wall 71B and the cover rear wall 71C is curved rearward as it extends upward. The cover rear wall 71C is formed in a U shape in cross section to follow the rear wheel 3. A cover upper wall 71D is formed in an upper portion of the cover rear wall 71*c* and the cover upper wall 71D extends upward toward the front. A raised-wall-shaped regulator placement portion 71E is formed on the left side of the cover upper wall 71D.

An air guide portion 71F extending leftward is famed leftward of the cover lower wall 71B, cover rear wall 71C and cover upper wall 71D. A plurality of ribs 71F1 (see FIG. 4) is famed in the air guide portion 71F, and the ribs 71F1 are inclined slightly rearward from the left end toward the right direction.

A cover right wall 71G is famed rightward of the cover front wall 71A, cover lower wall 71B, cover rear wall 71C and cover upper wall 71D such that the cover right wall 71G provides an obstruction on the right of them. The cover right wall 71G is placed in contact with the inner side (left side) of the right-side sidewall 73C of the box portion 70. The introduction cover portion 71 is fixedly fastened to the box portion 70 with a plurality of fastening members (not shown).

An enclosed space 61B enclosed with the box portion 70 and the introduction cover portion 71 is formed between the box portion 70 and the introduction cover portion 71. Specifically, the enclosed space 61B is formed by being enclosed with the upper wall 73A, right-side sidewall 73C, partition rear wall 73D and lower wall 73E of the box portion 70 and the cover front wall 71A, cover lower wall 71B, cover rear wall 71C, cover upper wall 71D, air guide portion 71F and cover right wall 71G of the introduction cover portion 71. The enclosed space 61B opens in the left direction (one of the vehicle width directions) through an opening 61C of a framed shape which is foiled by: the upper wall 73A, right-side sidewall 73C, partition rear wall 73D and lower wall 73E of the box portion 70; the cover front wall 71A and air guide portion 71F of the introduction cover portion 71; and the like. It is configured so that air, namely, intake air to be fed into the engine 10, is taken into the enclosed space 61B through the opening 61C.

As illustrated in FIG. 4 and FIG. 5, in the air cleaner box 61, a communication port 73G is famed in the partition rear wall 73D of the box portion 70, and the communication port 73G penetrates in the thickness direction. The communication port 73G allows the interior space 61A and the enclosed space 61B to communicate with each other. The intake air is able to flow into the interior space 61A from the enclosed space 61B via the communication port 73G. By the internal space 61A, enclosed space 61B and communication port 73G, an intake passage 67 (see FIG. 3) of the air cleaner box 61 is formed.

The element 62 is placed so as to block the communication port 73 from below, and the element 62 is placed in the condition where the element 62 is located along the partition rear wall 73D on the enclosed space 61B side. It is configured so that intake air is cleaned up by removal of foreign particles from the intake air through the element 62, and then the intake air is able to flow into the internal space 61A. In the intake passage 67 of the air cleaner box 61, the enclosed space 61B corresponds to a dirty side 67B into which intake air mixed with foreign particles flows, and the internal space 61A corresponds to a clean side 67A into which intake air flows after the foreign particles have been removed from the intake air.

As illustrate in FIG. 3, an intake passage 68 of the intake system 60 is comprised of the intake passage 67 of the air cleaner box 61, and the downstream-side intake passage 66 connected to the intake passage 67.

Figure 6:
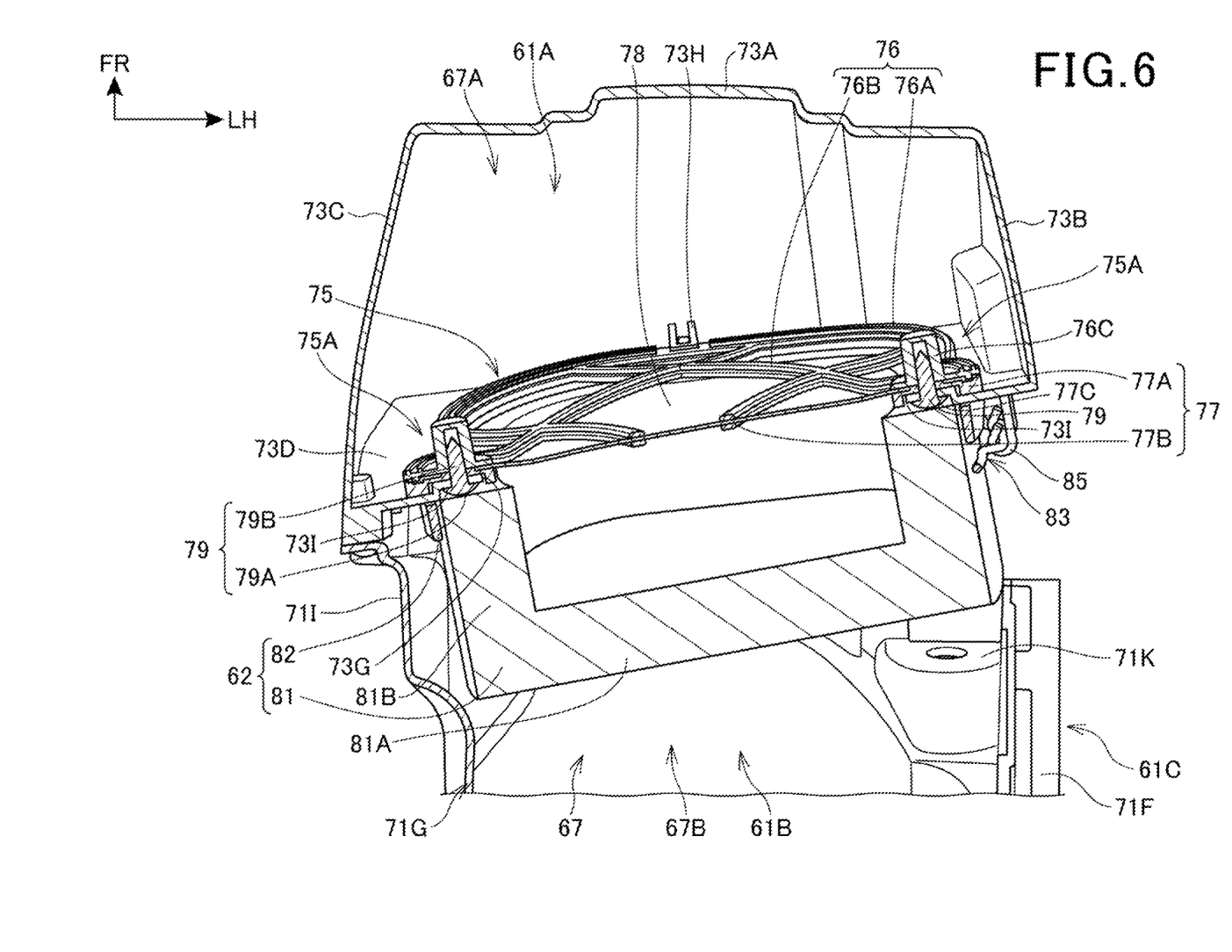
FIG. 6 is a cross-section view taken along the VI-VI line of FIG. 4.

FIG. 6 is a cross-section view taken along a VI-VI line of FIG. 4.

A guard (protective member) 75, which protects the element 62, is supported on the partition rear wall 73D of the box portion 70. The guard 75 includes: a pair of opposed frames 76, 77; and a sheet-shaped mesh 78 supported by being sandwiched between the frames 76, 77. The frames 76, 77 include: ring-shaped toroidal portions 76A, 77A which are larger in size than the communication port 73G; and grid-shaped reinforcing portions 76B, 77B which are supported by the inner periphery portions of the toroidal portions 76A, 77A. The mesh 78 is sandwiched between the frames 76, 77 in the condition where the mesh 78 is laid along the toroidal portions 76A, 77A and the reinforcing portions 76B, 77B.

The guard 75 is placed in the interior space 61A of the box portion 70, that is, placed in the clean side 67A. In the clean side 67A of the box portion 70, claws 73H are mounted on the upper wall 73A. The claws 73H are formed at intervals according to the thickness of the guard 75 with respect to the partition rear wall 73D.

Also, a pair of fastening portions 75A is formed on the toroidal portions 76A, 77A of the frames 76, 77. Each fastening portion 75A is made up of a boss 76C of the toroidal portion 76A and a hole 77C of the toroidal portion 77A.

The guard 75 is secured to the box portion 70 by: engaging the frames 76, 77 with the claws 73H while the guard 75 is overlaid on the communication port 73G along the partition rear wall 73D; and fastening screws 79 into a pair of fastening portions 75A. The screws 79 are secured into screw fastening portions 73I which are famed in the outer periphery portion of the communication port 73G of the partition rear wall 73D. The guard 75 is secured at three points. The guard 75 protects the element 62 on the clean side 67A side.

In this connection, each screw 79 used to fasten the guard 75 has a screw head 79A located on the dirty side 67B side, and a threaded shaft 79B fastened to the fastening portion 75A. The screw head 79A is fastened with the screw head 79A being contained in the screw fastening portion 73I which is formed in a recessed shape in the partition rear wall 73D. The process of fastening the screws 79 can be facilitated through the opening 61C of the air cleaner box 61. By performing such fastening, the sealing characteristics between the guard 75 and the partition rear wall 73D can be ensured, and also, when demounting/mounting of the element 62 is performed from a side of the vehicle, the guard 75 prevents the element 62 from catching.

On the opposite side of the partition rear wall 73D from the guard 75, the element 62 is placed on the dirty side 67B side. The element 62 is a wet-type element. The element 62 includes: an element body 81 that removes foreign particles from intake air; and an element base 82 that is secured to the element body 81.

The element body 81 is an approximately rectangular columnar body, and is famed in a shape with a hollow bottom. Specifically, the element body 81 includes an approximately rectangular plate-shaped end portion 81A and an approximately rectangular cylinder-shaped side portion 81B which is famed on the outer peripheral portion of the end portion 81A. The element base 82 is secured to the open-end side of the side portion 81B. The element base 82 is famed in an approximately rectangular cylinder shape. The element base 82 has an inner peripheral portion placed in contact with the outer periphery of the element body 81 to be secured to the element body 81.

As illustrated in FIG. 4, the element 62 is fixed with a fixing member 83 in a demountable manner. The fixing member 83 is composed of a wire. The fixing member 83 includes a fixing wire 84 that presses the element 62 against the partition rear wall 73D, and an engagement wire 85 that is coupled to the fixing wire 84.

As illustrated in FIG. 5, the fixing wire 84 is formed in a U shape with a rightward opening. Both end portions 84A of the U shape of the fixing wire 84 are bent inward in the front-rear direction. The end portions 84A are rotatably supported by claw-shaped support portions 73J protruding from the partition rear wall 73D. A left portion of the fixing wire 84 extends linearly in the front-rear direction, and a central portion in the front-rear direction is coupled to the U-shaped engagement wire 85. Both ends of the U-shaped engagement wire 85 are rotatably coupled to the fixing wire 84.

The engagement wire 85 is engaged with an engagement claw 73K in a disengageable manner, the engagement claw 73K being mounted on the left-side sidewall 73B of the box portion 70. The engagement claw 73K is famed on a wire holding portion 73L which is recessed in the left-side sidewall 73B in a stepped stage form on the right side. The engagement claw 73K protrudes leftward from the wire holding portion 73L. The engagement wire 85 is engaged with the engagement claw 73K in a disengageable manner in the condition where the engagement wire 85 is held on the wire holding portion 73L. The engagement wire 85 is engaged with the engagement claw 73K, whereby the fixing wire 84 is configured to be held in the condition where the fixing wire 84 is laid along the partition rear wall 73D.

As illustrated in FIG. 5, a positioning rib (positioning portion) 73M, which effects positioning of the element 62, is formed on the inner surface of the right-side sidewall 73C on the deep side with respect to the opening 61C. The positioning rib 73M is formed on the right side (deep side) of the communication port 73G. In the embodiment, the positioning rib 73M is formed in a position adjacent to the partition rear wall 73D. The positioning rib 73M is composed of a pair of front and rear ribs which protrude toward the opening 61C, and a recess-shaped space is created between the pair of front and rear ribs. Here, in a right portion of the element base 82 of the element 62, a protruding portion 82B (see FIG. 5) is formed to be fitted into between the positioning ribs 73M. The protruding portion 82B is fitted into between the pair of positioning ribs 73M from the left side (near side) toward the right side (deep side), in order to perform positioning of the element 62. That is, by the fit between the positioning rib 73M and the protruding portion 82B, the element 62 is configured to be located in a position (installation position) to block the communicating port 73G in absolute contact with the partition rear wall 73D.

A pair of front and rear guides 73N is famed on the partition rear wall 73D. Each guide 73N is famed in a rib shape protruding from the partition rear wall 73D into the dirty side 67B. The guides 73N extend from the left toward the right, and are famed such that the spacing between the pair of front and rear guides 73N is decreased as the guides 73N extend from the left toward the right. The guides 73N in the embodiment is famed on the right side of the center in the right-left direction of the communication port 73G. The guides 73N are formed to come into contact with the element base 82 of the element 62 inserted rightward from the opening 61C at left, and the guides 73N guide the element 62 toward the center in the front-rear direction so that the protruding portion 82B (see FIG. 5) of the element base 82 is fitted into (engaged with) the positioning rib 73M. Because the right side (the other side) is difficult to be visually checked from the opening 61C side, the position of the positioning rib 73M cannot be easily configured, but, at the time of installation, the element 62 can be guided and the positioned by the guide 73N. Thus, the presence of the guide 73N facilitates the positioning process.

As illustrated in FIG. 4, a holder 82A is formed in the element base 82, and the holder 82A protrudes toward the fixing member 83, and branches in a bifurcated form. The holder 82A is formed to have the amount of protrusion that allows the holder 82A holding the fixing wire 84 to be pressed against the partition rear wall 73D where the engagement wire 85 is engaged with the engagement claw 73K. Thereby, in the condition where the element 62 is pressed against the partition rear wall 73D, the element 62 is mounted to the air cleaner box 61. The partition rear wall 73D is sloped rearward as it extends upward in side view, and therefore the element 62 is mounted to be inclined rearward as the element 62 extends upward in side view.

Figure 7:
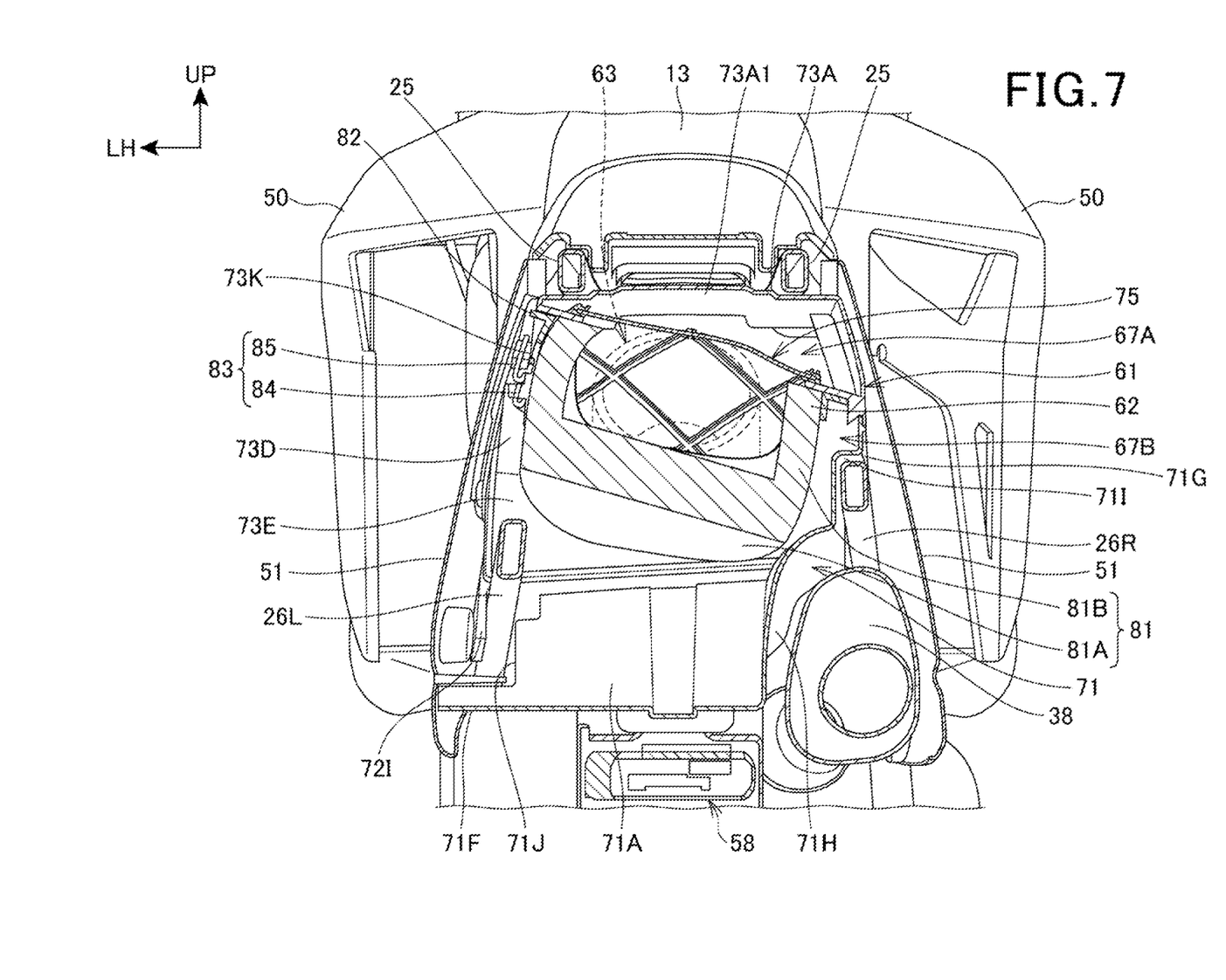
FIG. 7 is a cross-section view taken along the VII-VII line of FIG. 1.
Figure 8:
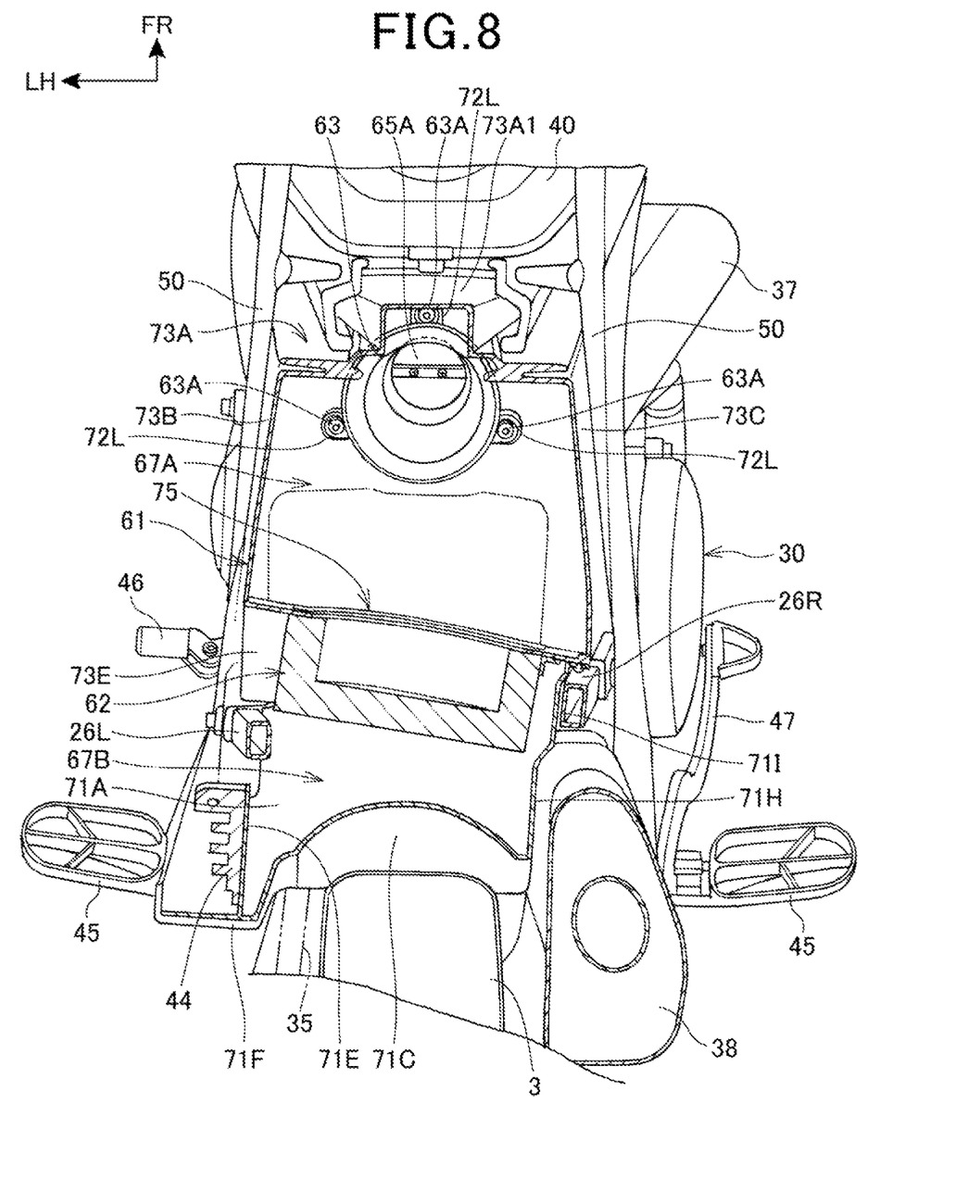
FIG. 8 is a cross-section view taken along the VIII-VIII line of FIG. 1.

FIG. 7 is a cross-section view taken along a VII-VII line of FIG. 1. FIG. 8 is a cross-section view taken along a VIII-VIII line of FIG. 1.

As illustrated in FIG. 3, FIG. 7 and FIG. 8, the air cleaner box 61 is placed underneath the seat 13. The air cleaner box 61 is placed such that the upper wall 73A of the box portion 70 is placed along the seat 13. A cushion clearance portion 72F, which is recessed in an arc shape toward the internal space 61A side, is formed in the front wall 72A (see FIG. 3) of the box portion 70 in such a manner as to avoid a reservoir tank 43A of the rear cushion 43.

A circular-shaped outlet 72G is formed in the front wall 72A of the box portion 70, the outlet 72G penetrating in the thickness direction. The funnel 63 is connected to the outlet 72G. As illustrated in FIG. 8, a plurality of fastening portions 63A is formed on the outer peripheral portion of the funnel 63. In the embodiment, the funnel 63 includes three fastening portions 63A placed on a front portion, a left portion and a right portion. Each fastening portion 63A is fastened to a fastening portion 72L with a screw 87 (see FIG. 3), the fastening portion 72L being famed on the front wall 72A around the outlet 72G. The screw 87 has a screw head 87A placed on the outside of the air cleaner box 61, and the screw 87 passes through and is fastened to the front wall 72A in the thickness direction. The funnel 63 is fastened at three points. The funnel 63 is removable because the funnel 63 is fastened with the screws 87, and therefore the funnel 63 is replaceable. Also, in lieu of the funnel 63 in question, another displacement funnel 63 may be mounted.

A bulge portion 73A1 is famed on the upper wall 73A of the box portion 70, and the bulge portion 73A1 bulges in such an upward concave manner corresponding to an upside of the funnel 63. The bulge portion 73A1 extends in the front-rear direction (see FIG. 7, FIG. 8). The air cleaner box 61 is placed underneath the seat 13 and thus an increase in capacity is facilitated. In addition, the capacity of the clean side 67A is easily increased because of the bulge portion 73A1. Because of the large capacity of the clean side 67A, another displacement funnel 63 is readily mounted in lieu of the funnel 63. Commonality between the air cleaner box 61 in the embodiment and another air cleaner box for a different displacement vehicle type which is not shown can be enabled. A reduction in manufacturing costs of the entire motorcycle 1 can be achieved.

It is noted that, in FIG. 8, a brake pedal 47 is mounted forward of the step 45 on the right side.

As illustrated in FIG. 4 and FIG. 5, a tubular-shaped breather 72J, which protrudes forward, is formed on the upper right-hand side of the outlet 72G on the front wall 72A of the box portion 70. The breather 72J is connected to the engine 10 through a breather hose which is not shown. In the configuration, through the breather 72J, blowby gas can flow from the engine 10 into the air cleaner box 61 in response to movement of a piston (not shown) of the engine 10.

Also, a tubular-shaped drain 72K, which protrudes forward, is famed on a lower end portion of the front wall 72A of the box portion 70. The drain 72K is connected to a drain tube 74. Engine oil mixed with the blowby gas flows into the air cleaner box 61, and then the engine oil is accumulated in the drain tube 74 through the drain 72K.

As illustrated in FIG. 5, in the air cleaner box 61 in the embodiment, an engagement piece 72I, which extends in a downward and rearward direction, is formed on the left side of the front wall 72A of the box portion 70. An engaging portion 72I1 with a C shape in side view is formed at a distal end of the engagement piece 72I, and the engagement piece 72I is supported on a left front portion of the left sub-frame 26L (see FIG. 1). The engagement piece 72I is situated downward of the element 62 in side view.

Also, a frame placement portion 71J, which is cut in a left-facing L shape, is formed in the cover front wall 71A of the introduction cover portion 71. As illustrated in FIG. 7, the left sub-frame 26L is placed in the frame placement portion 71J and extends on the right side of the engagement piece 72I.

A muffler placement portion 71H is formed in the cover right wall 71G of the introduction cover portion 71, the muffler placement portion 71H being recessed in an upper left direction on the basis of the muffler 38. The muffler placement portion 71H is placed with the muffler 38 inserted through the muffler placement portion 71H. Also, above the muffler placement portion 71H, a frame holding portion 71I is famed to be recessed leftward with respect to a right end face of the cover right wall 71G in a stepped stage form. The frame holding portion 71I is placed with the right sub-frame 26R is held in the frame holding portion 71I. In FIG. 7, the ECU 58 is placed to the left of the muffler 38. The ECU 58 is supported on the front surface of the front wall 71A of the introduction cover portion 71 as illustrated in FIG. 3.

Further, as illustrated in FIG. 1, FIG. 4 and FIG. 5, the regulator 44 is supported by the regulator placement portion 71E of the introduction cover portion 71. The regulator 44 is fastened to fastening portions 71E1, 71E2 of the regulator placement portion 71E. The regulator 44 is surrounded with the air guide portion 71F and the regulator placement portion 71E, and also the left of the regulator 44 is covered with the rear side cover 51. The regulator 44 is supported in the condition where the longitudinal direction in side view is along the left sub-frame 26L.

It is noted that, as illustrated in FIG. 5, a fastening portion 71K is formed in a rear left portion of the cover rear wall 71C, and the fastening portion 71K is formed with a hole penetrating in the vertical direction. The rear fender 55 (see FIG. 3) is fastened to the fastening portion 71K with a fastening member which is not shown.

As illustrated in FIG. 1 and FIG. 7, the air cleaner box 61 is placed in a space within the pair of left and right seat rails 25, 25, the left sub-frame 26L and the right sub-frame 26R. Because the air cleaner box 61 is placed in a space surrounded with the frames, the air cleaner box 61 is capable of being protected from the outside of the vehicle. The air cleaner box 61 is also placed rearward of the fuel tank 40 and also underneath the seat 13 on which a load is imposed by a rider sitting astride the seat 13. Because of this, a larger capacity of the box portion 70 can be ensured while the vehicle height is minimized, as well as the degree of freedom in design can be ensured.

The left sub-frame 26L extends from a point on the lower side than the right sub-frame 26R, and the space within the seat rails 25, 25, left sub-frame 26L and right sub-frame 26R has a larger opening to the left than the opening to the right. Here, for the element 62, in side view, the end portion 81A forming the longitudinal direction is placed along above the left sub-frame 26L, and also the side portion 81B is situated lateral to the side of the right sub-frame 26R and the side portion 81B is covered with the right sub-frame 26R from the right. Therefore, while the working efficiency of demounting/mounting of the element 62 can be ensured, the protection of the element 62 can be enabled.

Also, the muffler 38 is placed underneath the right sub-frame 26R. The right sub-frame 26R extends from a point upward of the left sub-frame 26L, and the element 62 is able to be protected from the outside on the right side, while a space is created underneath the right sub-frame 26R. In the space, the muffler 38 is placed. Thereby, the effective use of the space can be made in the motorcycle 1 with a limited carrying space.

In the embodiment, for demounting/mounting the element 62 such as for replacement or the like, the rear side cover 51 on the left side is demounted. When the rear side cover 51 on the left side is demounted, the element 62 is exposed through the opening 61C to a position rearward of the main frame 18, downward of the seat rail 25 and upward of the left sub-frame 26L. Therefore, the operator can access the element 62 from a large opening between the frames.

The engagement wire 85 of the fixing member 83 is disengaged, and the fixing member 83 is rotated. Thereupon, the fixing member 83 is separated from the element 62 to allow removal of the element 62. At this time, because the communication port 73G is located above the element 62, dust is easy to fall to the dirty side 67B, but is difficult to enter the clean side 67A.

In this stage, the element 62 is mounted at an inclination such that the element 62 is inclined rearward as the element 62 extends upward. Because of this, even if dust falls during the demounting/mounting of the element 62, dust can be easy to fall to the dirty side 67B, but difficult to enter the clean side 67A. Also, the element 62 blocks the communication port 73G from below. Therefore, even if dust falls from the air cleaner box 61 during the demounting/mounting of the element 62, the dust can be caught on the element 62 which is being demounted/mounted.

Meanwhile, for mounting an element 62, the element base 82 of the element 62 is moved toward the right side along the partition rear wall 73D. At this time, the element base 82 comes into contact with the guide 73N to be guided toward the center in the front-rear direction, so that the protruding portion 82B (see FIG. 5) of the element base 82 is fitted into the positioning rib 73M. As a result, the element 62 is positioned in the installation position.

After positioning of the element 62, the fixing member 83 is operated to engage the engagement wire 85 with an engagement claw 73K, whereupon the element 62 is fixed by the fixing member 83. Then, the rear side cover 51 is attached to the body frame F. Thereby, the opening 61C is covered with the rear side cover 51 from the left, and the element 62 is covered from the left.

As described above, according to the embodiment to which the present invention is applied, an intake device structure of a saddle riding vehicle includes: the head pipe 17; the main frame 18 that extends rearward from the head pipe 17; the seat rail 25 that extends rearward from the main frame 18; the sub-frames 26L, 26R that connect the main frame 18 and the seat rail 25 to each other; the seat 13 that is supported on the seat rail 25; and the air cleaner box 61. In the intake device structure, the element 62 in the air cleaner box 61 is inclined rearward as the element 62 extends upward, and also the element 62 is mounted underneath the seat rail 25 in side view such that the element 62 is located along the sub-frames 26L, 26R.

Therefore, the element 62 in the air cleaner box 61 is inclined rearward as the element 62 extends upward. Thereby, the volume of the clean side 67A can be ensured while the vehicle height is minimized, and also even if dust falls during the demounting/mounting of the element 62, the dust can be made easy to fall to the dirty side 67B, but difficult to enter the clean side 67A. Further, in side view, the element 62 is placed underneath the seat rail 25 and located along the sub-frames 26L, 26R which connect the main frame 18 and the seat rail 25 to each other. Thereby, the element 62 can be protected and also placed underneath the seat 13, so that the degree of freedom in design can be offered.

In the embodiment, the element 62 blocks, from below, the communication port 73G which allows the dirty side 67B and the clean side 67A to communicate with each other. Therefore, even if dust falls from the air cleaner box 61 during the demounting/mounting of the element 62, the dust can be caught on the element 62 which is being demounted/mounted.

Further, in the embodiment, the element 62 is demountable from the side of the vehicle. Therefore, the demounting/mounting process of the element 62 is facilitated, so that the working efficiency of the demounting/mounting process can be improved.

Further, in the embodiment, the air cleaner box 61 includes the guard 75 to protect the element 62. The guard 75 is placed in the clean side 67A and is fastened from the dirty side 67B. Therefore, the sealing characteristics between the guard 75 and the partition rear wall 73D of the air cleaner box 61 can be ensured, and also, when demounting/mounting of the element 62 is performed from the side of the vehicle, the element 62 can be prevented from catching by the guard 75.

Further, in the embodiment, the sub-frames 26L, 26R are mounted as a pair of left and right sub-frames 26L, 26R. In side view, the left sub-frame 26L is offset from the right sub-frame 26R in the downward direction of at least one of the rearward direction and the downward direction. The right sub-frame 26R is mounted in the position where the right sub-frame 26R covers a side of the element 62, and the element 62 is demountable from above the left sub-frame 26L. Therefore, the pair of left and right sub-frames 26L, 26R are vertically offset from each other. Thereby, ensuring of the working efficiency of demounting/mounting of the element 62, and the protection of the element 62 can be enabled.

Further, in the embodiment, the positioning rib 73M is placed on the right side and is engaged with the element 62 to position the element 62, and the guide 73N is provided to guide mounting of the element 62 so that the element 62 is engaged with the positioning rib 73M. The mounting of the element 62 can be performed from the left side. Therefore, because the right side is difficult to be visually checked from the left side, the element 62 is guided by the guide 73N. Thereby, the mounting of the element 62 can be facilitated.

Further, in the embodiment, the air cleaner box 61 is mounted with the funnel 63 that is mounted in a replaceable manner. Therefore, the funnel 63 of the air cleaner box 61 may be replaced with another displacement funnel 63. Thus, commonality of the air cleaner box 61 may be enabled between vehicle types with different displacements. Because of the commonality of the air cleaner box 61, a reduction in manufacturing costs can be achieved. Specifically, the common air cleaner box 61 is capable of being used even for a vehicle type of 450 cc displacement and for a vehicle type of 250 cc displacement, and thereby the manufacturing costs of the motorcycle 1 can be driven down.

Further, in the embodiment, the muffler 38 is situated downward of the right sub-frame 26R. Therefore, the placement of the muffler 38 on the rightward side of the vehicle allows the muffler 38 to be placed downward of the right sub-frame 26R which is offset to the upper side to protect a side of the element. Thereby, the effective use of the space can be made in the motorcycle 1 with a limited carrying space.

It should be understood that the foregoing embodiment has been presented to provide an illustrative form to which the present invention is applied, and therefore the present invention is not limited to the foregoing embodiment.

In the foregoing embodiment, the motorcycle 1 has been described as an example, but the present invention is not limited to this. The present invention may be applied to a three-wheeled saddle riding vehicle having two front or rear wheels, a saddle riding vehicle having four or more wheels, and other any saddle riding vehicle such as a scooter and the like.

Further, in the above-described embodiment, the configuration has been described in which the left sub-frame 26L is mounted to be offset from the right sub-frame 26R in the downward direction in side view. However, the left sub-frame 26L may be offset from the right sub-frame 26R in a rearward direction or in a rearward and downward direction in side view. That is, the left sub-frame 26L may be mounted to be offset from the other sub-frame 26R in at least any one of the rearward direction and the downward direction in side view.

REFERENCE SIGNS LIST

13 . . . Seat
17 . . . Head pipe
18 . . . Main frame
25 . . . Seat rail
26L . . . Left sub-frame (one sub-frame)
26R . . . Right sub-frame (the other sub-frame)
38 . . . Muffler
61 . . . Air cleaner box (intake device)
62 . . . Element
63 . . . Funnel
67A . . . Dirty side
67B . . . Clean side
73G . . . Communication port
73M . . . Positioning rib (positioning portion)
73N . . . Guide
75 . . . Guard (protective member)

The invention claimed is:

1. An intake device structure of a saddle riding vehicle, comprising: a head pipe; a main frame that extends rearward from the head pipe; a seat rail that extends rearward from the main frame; sub-frames that connect the main frame and the seat rail to each other; a seat that is supported on the seat rail; and an intake device,
   wherein the intake device includes an element that is inclined rearward as the element extends upward, and the element is also mounted underneath the seat rail in side view such that the element is located along the sub-frames,
   the sub-frames are mounted as a pair in a vehicle width direction,
   in side view, one sub-frame of the sub-frames is offset from the other sub-frame in at least one of a rearward direction and a downward direction,
   the other sub-frame is mounted in a position where the other sub-frame covers a side of the element, and
   the element is demountable from above the one sub-frame.

2. The intake device structure of the saddle riding vehicle according to claim 1, wherein the element blocks, from below, a communication port that allows a dirty side and a clean side to communicate with each other.

3. The intake device structure of the saddle riding vehicle according to claim 1, wherein the element is demountable from a side of the vehicle.

4. The intake device structure of the saddle riding vehicle according to claim 1,
   wherein the intake device includes a protective member that protects the element, and
   the protective member is placed in a clean side and fastened from a dirty side.

5. The intake device structure of the saddle riding vehicle according to claim 1, further comprising:
   a positioning portion that is placed on the other side in the vehicle width direction, and that is engaged with the element to position the element; and
   a guide that guides mounting of the element in order for the element to be engaged with the positioning portion,
   wherein the element is mountable from one side in the vehicle width direction.

6. The intake device structure of the saddle riding vehicle according to claim 1, wherein the intake device is mounted with a funnel that is mounted in a replaceable manner.

7. The intake device structure of the saddle riding vehicle according to claim 1, wherein the other sub-frame is placed to allow a muffler to be situated underneath the other sub-frame.

* * * * *